United States Patent [19]
Yoshikawa et al.

[11] 3,880,973
[45] Apr. 29, 1975

[54] BLOW MOLDING PROCESS FOR FORMING A MOLDING HAVING A SCREW-THREAD PORTION

[75] Inventors: Shinsuke Yoshikawa; Yuji Sawa, both of Iwaki-shi, Fukushima, Japan

[73] Assignee: Kureha Kagaku Kogyo Kabushiki Kaisha; Mitsui Toatsu Chemicals Inc., both of Tokyo, Japan

[22] Filed: Sept. 24, 1973

[21] Appl. No.: 399,911

[30] Foreign Application Priority Data
Sept. 28, 1972  Japan.............................. 47-96647

[52] U.S. Cl. .......... 264/94; 264/327; 425/DIG. 208
[51] Int. Cl. ............................................. B29c 17/07
[58] Field of Search ............ 264/89, 90, 92, 93, 94, 264/96–99, 327, 318; 425/DIG. 208

[56] References Cited
UNITED STATES PATENTS

| | | | |
|---|---|---|---|
| 3,496,258 | 2/1970 | Wiley | 264/98 X |
| 3,781,395 | 12/1973 | Uhlig | 264/327 X |
| 3,801,690 | 4/1974 | Gilbert | 264/99 |

Primary Examiner—Jan H. Silbaugh
Attorney, Agent, or Firm—Sughrue, Rothwell, Mion, Zinn & Macpeak

[57] ABSTRACT

In a process for blow molding of a thermoplastic resin parison by using a mold, the resin is blown and molded in the mold while a local part of the mold is heated for a short period of time to elevate the temperature thereof above the temperature of the parison itself but up to the vicinity of the melting point thereof so that the temperature of the surface layer of the parison in contact with the local part of the said mold may be made higher than that of the parison body itself, and thereafter the resulting molding is taken out from the mold after cooling and solidification. In the present blow molding process is used a specific blow molding apparatus in which the surface of a mold body in the local part thereof is electrically insulated and an electric heating element is provided on the said insulated part in the form of a coating film or of a thin layer mold, the said heating element being able to heat for a short period of time during molding.

2 Claims, 5 Drawing Figures

BLOW MOLDING PROCESS FOR FORMING A MOLDING HAVING A SCREW-THREAD PORTION

BACKGROUND OF THE INVENTION

1. Field of the Invention

This invention relates to a novel and improved blow molding process for improving the efficiency of molding the parts of complicated shapes particularly in a blow molding of synthetic resins.

2. Description of the Prior Art

A so-called melt blow process has hitherto been mainly practiced for the molding of plastic containers, where a resin is blown and molded in the molten state. According to this process, even relatively complicated parts of containers such as mouthpieces, screw parts, etc. may easily be molded. Whereas, a so-called biaxial stretch blow molding process has been adopted in these days for the molding of polyvinylidene chloride containers, polypropylene containers, etc., where a parison which has once been cooled is heated up to the range of a stretching temperature to stretch the same in the longitudinal direction and thereafter is blown and molded, for the purpose of strengthening the stretched orientation of the used resins thereby to efficiently make the best use of the natural characters of the resins themselves and of improving the qualities of the resins such as falling substance impact strength, clarity, etc., and the good result of the said molding process has become noticed. In the stretch blow molding process, however, the used resins being not molten are difficult to mold, and further, an extremely high molding pressure is required. For example, a molding air pressure of about 2–4 kg/cm$^2$ or so is sufficient in a melt blow molding process, while in a polypropylene biaxial stretch blow molding process even a higher molding pressure of 7–10 kg/cm$^2$ is often insufficient for the molding of complicated parts of containers such as mouthpieces, screw parts, etc. However, it is extremely questionable from the point of apparatus to be used to use any higher blowing pressure than the said one. Due to the said reason, the practice has been to obtain desired moldings of determined shapes by molding only the screw parts thereof by means of another compression molding process, as suggested say in U.S. Pat. Nos. 3,632,264 and 3,649,150. However, this is defective in that the construction of the apparatus to be used is extremely complicated.

SUMMARY OF THE INVENTION

This invention provides an improved blow molding process. According to the present invention, even complicated parts such as screw parts may uniformly be molded only with a blowing air pressure like as a melt blow molding process, and without any mechanical compression molding unlike the conventional methods, and further, the moldings obtained by the said present process may have excellent surface brilliance.

The inventors have found that, when only a part of a parison corresponding to screw parts which has been heated up to the stretching temperature is heated nearly above the temperature of the parison body itself but up to the vicinity of the melting point of the resin, the screw parts may be molded due to the pressure during the blow molding, similarly to a melt blow molding process. If the surface of a non-stretched parison corresponding to screw parts is heated by means of another apparatus, uneven stretching occurs after the longitudinal stretching thereof. In addition, even if the surface of the part corresponding to the screw parts is heated after the said longitudinal stretching, it is difficult to heat uniformly the periphery thereof and only the screw parts and the upper portion of the resulting molded container is badly affected thereby, although the original object may be attained.

In the present invention, the surface of a mold corresponding to complicated screw parts, etc. is heated simultaneously with the step for blowing and molding a longitudinally stretched parison with a blow air thereby to heat the outer surface of the resin being in contact therewith nearly above the temperature of the parison body itself but up to the melting point thereof or to the temperature in the vicinity thereof where the resin may easily be deformed and the parison corresponding to the complicated screw parts, etc. is molded due to the pressure of a blow air to shape the same according to the determined shape of the mold, and then, after the mold is immediately cooled to the temperature at which the resulting molding does not deform when released from the mold, the molding is taken out from the mold by opening the same, whereby even parts of complicated shapes may easily be molded according to the determined shape of the mold. According to the present molding process, the surface brilliance of the said complicated parts may remarkably be improved. For the said process of heating and cooling the surface of the mold, a film or a mold of an electric heating element is provided on the electrically insulated mold body and a high electric current of low voltage is passes therethrough to heat only the surface of a local part of the parison up to a determined temperature within several seconds thereby to deform the resin to the wall of the mold, and thereafter the electric current is cut after the desired deformation of the resin and the heat of the said heating element is absorbed by the resin or the mold body within several seconds to cool the resin to the temperature at which the same is no more deformed. In the said process, it is necessary that only the surface part of the parison being in contact with the mold corresponding to the local part of the parison to be screw parts is heated while the inner part of the parison is kept below the melting point thereof, preferably at the temperature at which the resin is stretched and orientated, and that the heating is carried out for a short period of time or within 10 seconds or less.

DESCRIPTION OF THE PREFERRED EMBODIMENTS

Now, some preferred embodiments of the present invention will be explained in detail, with reference to the drawings attached hereto. It is to be understood that the present invention is not whatsoever limited due to the following explanation on the drawings which is only for some preferred embodiments of the present invention.

Figure 1:
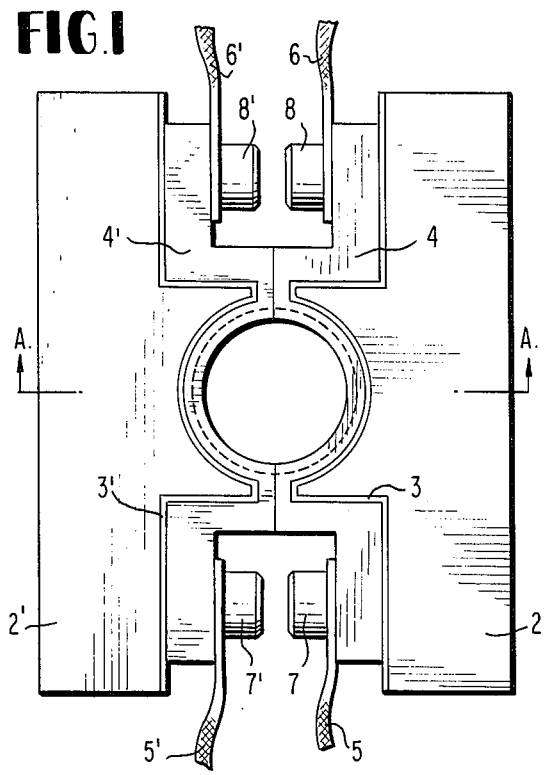
FIG. 1 is a plan view showing a two-piece divided screw mold.
Figure 2:
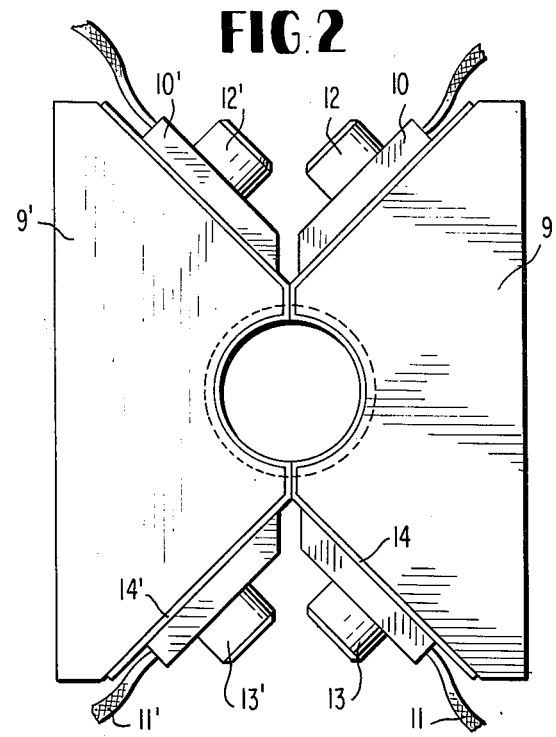
FIG. 2 is a plan view showing a mold of another construction which is different from that of the FIG. 1.
Figure 3:
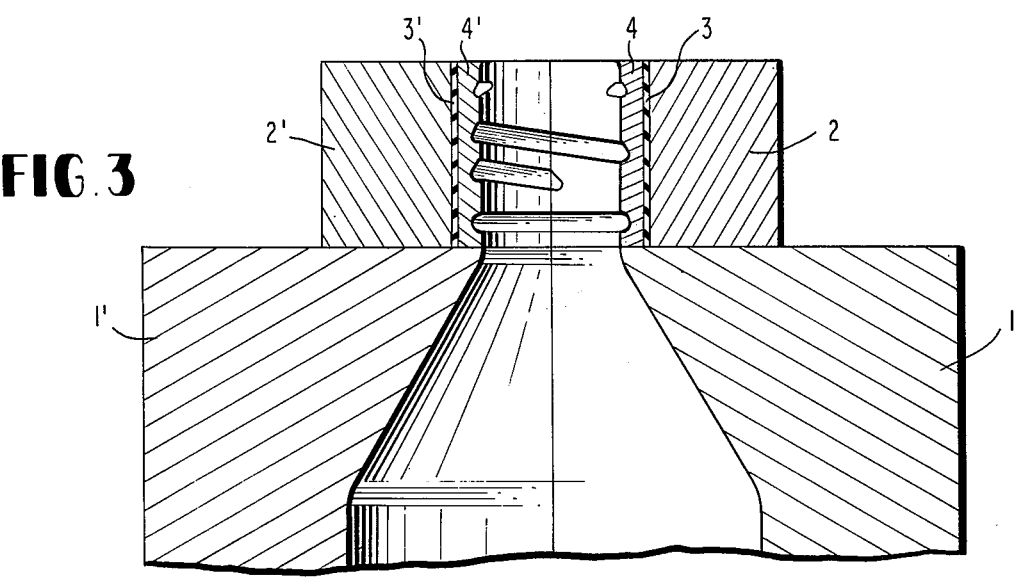
FIG. 3 is a section view cut along the line A—A of the FIG. 1.
Figure 5:
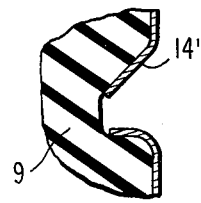
FIG. 5 is an enlarged view of the screw mold of the FIG. 2.

FIG. 3 is a part of a cut section view of a mold illustrating one embodiment of the present invention. On each of two-piece divided mold bodies 1 and 1' is provided a screw mold. FIG. 1 is a plan view taken from the upper side of the said screw mold. Referring to the FIG. 1, insulating films 3 and 3' are coated on screw mold bodies 2 and 2', and metal screw molds 4 and 4' as electric heating elements are provided thereupon, and both ends of the said molds are connected with lead wires 5, 6, 5' and 6', respectively, by means of bolts 7, 8, 7' and 8'. These bolts 7, 8, 7' and 8' are of course electrically insulated from the mold bodies 2 and 2'. When a high electric current of low voltage is passed between the respective lead wires 5 and 6 and also between 5' and 6' under such state, the inner wall part 18 of the mold of a relatively small sectional area is heated. FIG. 2 shows another embodiment of another mold the function of which is similar to the mold of the FIG. 1. With reference to the FIG. 2, screw mold bodies 9 and 9' are made of insulators such as ceramics or the like, and a metal for example nickel plate is applied on the said bodies 9 and 9' to form electric heating elements 14 and 14' as shown in the enlarged FIG. 5. On both ends of the elements 14 and 14' are fixed terminals 10, 11, 10' and 11' by means of bolts 12, 13, 12' and 13', and a high electric current of low voltage is passed to these terminals 10, 11, 10' and 11' to heat the mold. In this structure, the sectional area of the part to which the electric current is passed is made as smaller as possible in view of the fact that if the said area is large, a higher electric current is required in order to obtain the same heating temperature.

Figure 4:
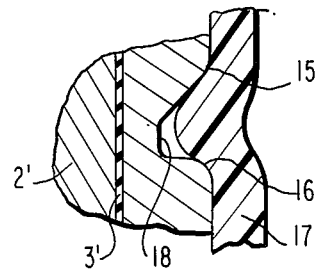
FIG. 4 is an enlarged view of the screw mold of the FIG. 1.

The effect on the molding with the mold of the above mentioned structure will be mentioned below. When a longitudinally stretched circular parison is blown and molded by putting the same between the divided molds 1 and 1', the resin is in contact with the screw inner walls 15 and 16 and so do not reach the bottom of the screw thread, as shown in the enlarged FIG. 4. Accordingly, the resin is in general solidified in the said state. Whereas, if the screw molds 4 and 4' are heated when the resin is brought into contact with the wall surfaces, according to the process of the present invention, the resin 17 is molten in the parts 15 and 16 which are in contact with the mold and is penetrated into the bottom part 18 of the screw thread while compressed due to the pressure of a blow air. Afterwards, when the electric current is cut off, the heat of the screw molds 4 and 4' is absorbed by the screw mold bodies 2 and 2' or by the resin 17 and then the said molds 4 and 4' are cooled. Thus, the obtained molding may easily be taken out by opening the mold. In this operation, since the screw mold bodies 2, 2', 9 and 9' and the divided molds 1 and 1' are heated, it is desirable to forcedly cool them with water or air.

As mentioned above, the present invention is to provide a novel and improved blow molding process as well as an apparatus therefor, where the surface of a resin to be molded is locally heated to shape the same to a desired shape and thereafter the said resin is immediately cooled and solidified after the said shaping. Thus, the characteristic feature of the present invention is to improve difficult blow molding such as biaxial stretch blow molding or the like, or more precisely to supplement the incompletion in such difficult blow molding of complicated shapes which are not sufficiently molded only with a blow air. According to the present invention, the object may be attained without any mechanical pressure, and so the structure of the apparatus to be used may be simple. In addition, the process of the present invention may be widely adopted, although the use of other mechanical compression molding operation is limited.

What is claimed is:

1. In a process for blow molding a thermoplastic resin parison to form a molding having a screw-thread portion by using a mold having a corresponding screw-thread portion, wherein the parison, which has once been cooled, is heated up to the range of a stretching temperature to stretch the parison in the longitudinal direction; and thereafter the parison is blown and molded within said mold, said screw-thread portion of said molding being molded only with blowing air pressure; and thereafter the resulting molding is removed from the mold after cooling and solidification; the improvement comprising the steps of heating only said screw-thread portion of the mold for a short period of time to elevate the temperature thereof above the temperature of the resin parison body itself and up to the vicinity of the melting point of the parison so that the temperature of only the parison surface in contact with said screw-thread portion is made higher than that of the parison body itself, and thereafter removing the resulting molding having a completed screw-thread portion from the mold after cooling and solidification.

2. The blow molding process as claimed in claim 1, wherein said heating step comprises electrically heating said screw-thread portion by passing an electrical current through an electric heating element provided on an electrically insulated layer formed on the surface of said screw-thread portion.

* * * * *